(12) United States Patent
Murphy et al.

(10) Patent No.: US 9,444,620 B1
(45) Date of Patent: Sep. 13, 2016

(54) METHODS FOR BINDING A SESSION IDENTIFIER TO MACHINE-SPECIFIC IDENTIFIERS AND SYSTEMS THEREOF

(75) Inventors: Alan Murphy, Seattle, WA (US); Ido Breger, Tel Aviv (IL)

(73) Assignee: F5 Networks, Inc., Seattle, WA (US)

( * ) Notice: Subject to any disclaimer, the term of this patent is extended or adjusted under 35 U.S.C. 154(b) by 251 days.

(21) Appl. No.: 12/822,617

(22) Filed: Jun. 24, 2010

(51) Int. Cl.
*H04L 29/06* (2006.01)
*H04L 9/08* (2006.01)

(52) U.S. Cl.
CPC ............. *H04L 9/0822* (2013.01); *H04L 63/18* (2013.01)

(58) Field of Classification Search
CPC . H04L 9/0822; H04L 9/0861; H04L 9/0827; H04L 65/1083; H04L 63/18
USPC .................................................. 713/168, 170
See application file for complete search history.

(56) References Cited

U.S. PATENT DOCUMENTS

| | | | |
|---|---|---|---|
| 6,711,264 B1 * | 3/2004 | Matsumoto | H04L 9/0891 380/277 |
| 6,711,677 B1 * | 3/2004 | Wiegley | H04L 9/3236 713/151 |
| 6,886,102 B1 * | 4/2005 | Lyle | G06F 21/554 709/206 |
| 6,895,504 B1 * | 5/2005 | Zhang | H04N 7/165 348/E7.056 |
| 6,971,028 B1 * | 11/2005 | Lyle | G06F 21/554 709/224 |
| 7,121,460 B1 * | 10/2006 | Parsons | G06Q 20/341 235/379 |
| 7,200,234 B2 * | 4/2007 | Bousis | H04L 9/12 380/273 |
| 7,229,009 B1 * | 6/2007 | Parsons | G06Q 20/341 235/379 |
| 7,309,004 B1 * | 12/2007 | Muschellack | G06Q 20/042 235/379 |
| 7,417,990 B2 * | 8/2008 | Ikeda | H04L 12/18 370/390 |
| 7,487,353 B2 * | 2/2009 | Pryor | H04L 9/32 713/168 |
| 7,640,235 B2 | 12/2009 | Shulman et al. | |
| 7,721,951 B1 * | 5/2010 | Parsons | G06Q 20/341 235/379 |
| 7,733,859 B2 * | 6/2010 | Takahashi | H04L 12/4625 370/351 |

(Continued)

OTHER PUBLICATIONS asp.net Forums, "How to Remove Cookie Sessionid from Outgoing Response?," at Microsoft asp.net, pp. 1-4 (Dec. 2009).

(Continued)

*Primary Examiner* — David Garcia Cervetti
(74) *Attorney, Agent, or Firm* — LeClairRyan, a Professional Corporation

(57) ABSTRACT

A method, computer readable medium, and apparatus for secure application delivery includes forming at a traffic management device a session identifier in response to a first request from a client device for access to a network application. The session identifier is encrypted for sending to the client device using a session variable formed by hashing at least one physical identifier associated uniquely with the client device in response to the first request. In a second request from the client device to access the network application, the encrypted session identifier is decrypted using an updated value of the session variable. The access to the network application is provided when the decrypted session identifier matches the formed session identifier, and denied when the decrypted session identifier does not match the formed session identifier.

33 Claims, 3 Drawing Sheets

(56) References Cited

U.S. PATENT DOCUMENTS

| | | | | |
|---|---|---|---|---|
| 7,743,420 | B2 | 6/2010 | Shulman et al. | |
| 7,752,662 | B2 | 7/2010 | Shulman et al. | |
| 7,881,446 | B1* | 2/2011 | Apple | H04M 15/08 379/114.21 |
| 7,988,039 | B1* | 8/2011 | Muschellack | G06Q 20/042 235/379 |
| 8,015,595 | B2* | 9/2011 | Benbrahim | G07F 17/32 380/251 |
| 8,031,849 | B1* | 10/2011 | Apple | H04M 15/08 379/114.03 |
| 8,046,504 | B2* | 10/2011 | Feinberg | G06F 9/445 710/20 |
| 8,064,580 | B1* | 11/2011 | Apple | H04M 15/08 379/114.14 |
| 8,081,958 | B2* | 12/2011 | Soderstrom | H04L 12/1818 370/260 |
| 8,154,999 | B2* | 4/2012 | Tsuge | H04L 12/2856 370/230 |
| 8,261,087 | B2* | 9/2012 | Fort | G06F 21/31 713/184 |
| 8,295,446 | B1* | 10/2012 | Apple | H04M 15/08 379/88.01 |
| 8,606,234 | B2* | 12/2013 | Pei | G06F 21/42 455/410 |
| 2002/0004784 | A1* | 1/2002 | Forbes | G06F 21/606 705/51 |
| 2002/0032855 | A1* | 3/2002 | Neves | H04L 29/12009 713/154 |
| 2002/0085710 | A1* | 7/2002 | Ananth | H04L 9/065 380/37 |
| 2003/0053632 | A1* | 3/2003 | Bousis | H04L 9/12 380/277 |
| 2003/0131115 | A1* | 7/2003 | Mi | G06F 21/6218 709/229 |
| 2003/0187805 | A1* | 10/2003 | Shen | G06Q 30/06 705/80 |
| 2004/0039924 | A1* | 2/2004 | Baldwin | G06F 21/53 713/189 |
| 2004/0073792 | A1* | 4/2004 | Noble | G06F 21/6227 713/168 |
| 2004/0096055 | A1* | 5/2004 | Williams | H04L 9/3263 380/1 |
| 2004/0187036 | A1* | 9/2004 | Nakamura | G06F 21/6218 726/7 |
| 2005/0137983 | A1* | 6/2005 | Bells | G06F 21/10 705/51 |
| 2005/0198501 | A1* | 9/2005 | Andreev | H04L 63/0815 713/168 |
| 2006/0072572 | A1* | 4/2006 | Ikeda | H04L 12/18 370/390 |
| 2006/0264201 | A1* | 11/2006 | Zhang | H04L 29/12783 455/411 |
| 2006/0265484 | A1* | 11/2006 | Delia | H04W 4/02 709/223 |
| 2006/0272008 | A1 | 11/2006 | Shulman et al. | |
| 2006/0282529 | A1* | 12/2006 | Nordin | H04L 43/0811 709/224 |
| 2006/0288213 | A1* | 12/2006 | Gasparini | G06F 21/31 713/170 |
| 2007/0113269 | A1* | 5/2007 | Zhang | H04L 63/08 726/4 |
| 2007/0124806 | A1 | 5/2007 | Shulman et al. | |
| 2007/0150603 | A1* | 6/2007 | Crull | G06F 17/3089 709/227 |
| 2007/0214503 | A1 | 9/2007 | Shulman et al. | |
| 2007/0274290 | A1* | 11/2007 | Takahashi | H04L 12/4625 370/351 |
| 2007/0294539 | A1 | 12/2007 | Shulman et al. | |
| 2008/0034442 | A1* | 2/2008 | Nonaka | G06F 21/10 726/27 |
| 2008/0034443 | A1* | 2/2008 | Nonaka | G06F 21/10 726/27 |
| 2008/0049627 | A1* | 2/2008 | Nordin | H04L 41/12 370/241 |
| 2008/0132215 | A1* | 6/2008 | Soderstrom | H04L 12/1818 455/416 |
| 2008/0175393 | A1* | 7/2008 | Oba | H04L 63/062 380/279 |
| 2008/0178277 | A1* | 7/2008 | Oba | H04L 63/0807 726/10 |
| 2008/0209205 | A1* | 8/2008 | Rowley | H04L 9/321 713/153 |
| 2008/0212783 | A1* | 9/2008 | Oba | H04L 9/083 380/279 |
| 2008/0320307 | A1* | 12/2008 | Zhang | H04L 9/3236 713/170 |
| 2009/0024853 | A1* | 1/2009 | Yeap | H04L 63/0428 713/182 |
| 2009/0037995 | A1* | 2/2009 | Zapata | G06F 21/43 726/9 |
| 2009/0052671 | A1* | 2/2009 | Bauchot | G06F 21/10 380/277 |
| 2009/0131053 | A1* | 5/2009 | Sachs | H04W 36/0016 455/436 |
| 2009/0177698 | A1* | 7/2009 | Chan | G06F 21/105 |
| 2009/0285118 | A1* | 11/2009 | Yoshikawa | G06Q 40/00 370/254 |
| 2009/0288143 | A1* | 11/2009 | Stebila | G06F 21/445 726/3 |
| 2010/0058054 | A1* | 3/2010 | Irvine | H04L 63/0407 713/165 |
| 2010/0088752 | A1* | 4/2010 | Nagulakonda | H04L 9/3226 726/6 |
| 2010/0134818 | A1* | 6/2010 | Minamizono | G06F 3/1288 358/1.13 |
| 2010/0146085 | A1* | 6/2010 | Van Wie | A63F 13/12 709/220 |
| 2010/0154066 | A1* | 6/2010 | Hammes | G06F 21/31 726/30 |
| 2010/0183150 | A1* | 7/2010 | Lee | H04L 9/0822 380/255 |
| 2010/0199104 | A1* | 8/2010 | Van Rijnswou | G06F 21/53 713/189 |
| 2011/0029581 | A1* | 2/2011 | Zhao | G06F 11/3438 707/812 |
| 2011/0246651 | A1* | 10/2011 | Djabarov | G06F 11/3495 709/224 |
| 2011/0295996 | A1* | 12/2011 | Qiu | G06F 9/505 709/224 |

OTHER PUBLICATIONS

Greenicicle, "Using the Silverlight HttpClient in WCF, and Still Passing Cookies," at http://greenicicleblog.com, pp. 1-8 (Oct. 2009).
Imperva, "Imperva Technical Brief; SecureSphere and the OWASP Top Ten," IMPERVA US Headquarters, Foster City, CA (3 pages) (2008).
Imperva, "Web Application Firewall," iMPERVA Headquarters, Redwood Shores, CA (4 pages) (2010).
Masone et al., "WSKE: Web Server Key Enabled Cookies," Department of Computer Science, Dartmouth College Hanover, NH (13 pages) (2007).
Miller, "Persistent Login Cookie Best Practice," The Fishbowl Weblog at http://fishbowl.patiche.org/, pp. 1-6 (2004).
Murdoch, "Hardened Stateless Session Cookies," University of Cambridge, Computer Laboratory pp. 1-9 (Apr. 2008).
Net, "Get MAC for Remote Computer," NET Framework Developer Center at http://msdn.microsoft.com/en-us/netframework/aa496123.aspx, pp. 1-2 (2008).
Oracle, "Configuring Oracle Web Cache for Session Binding and Load Balancing," ORACLE Technology Network at http://www.oracle.com/technology/index.html, pp. 1-6 (2004).
Prosise, "Foiling Session Hijacking Attempts," msdn, Wicked Code at http://msdn.microsoft.com/en-us/magazine/default.aspx, pp. 1-6 (Jul. 2004).
Supportwiki, "Web: Cookies," from SupportWiki at http://wiki.livejournal.org/index.php/Main_Page, pp. 1-3 (Feb. 2008).
Varjabedian, "Bullet Proof Cookies," asp.net Web Development CodeProject at http://www.codeproject.com, pp. 1-6 (2007).

* cited by examiner

METHODS FOR BINDING A SESSION IDENTIFIER TO MACHINE-SPECIFIC IDENTIFIERS AND SYSTEMS THEREOF

TECHNOLOGICAL FIELD

This technology generally relates to securing network applications, and more particularly, to systems and methods for binding a session identifier to one or more machine-specific unique physical identifiers (IDs) to prevent theft of the session identifier.

BACKGROUND

Many websites use one or more session identifiers, e.g., cookies, to store cached authentication credentials of users and applications, so that users don't have to authenticate to the website between browsing sessions when moving from web page to web page within the website. Examples of such websites include websites providing secure e-mail services, and websites requiring user-authentication for accessing network applications. Regardless of how secure the session identifier content is, for example, fully encrypted credentials with the key stored on the server (or, a proxy device), or if the application is using a Secure Sockets Layer (SSL) connection to secure the session identifier in transit, it is still possible for a malicious user, eavesdropper, or application to subvert server authentication mechanisms by stealing the full user session identifier. Conventionally, using standard and readily available data, e.g., a source Internet Protocol (IP) address, to prevent theft of the session identifier can be problematic since IP addresses are dynamic for many remote Internet connections, and often many unique client connections can come from the same source IP address (e.g., from organizations that use source-based Network Address Translation (NAT), such as large Internet Service Providers or ISPs). Unfortunately, conventional technologies do not resolve the problem of session identifier theft (e.g., cookie theft).

SUMMARY

One example of the technology is a method for providing secure application delivery. The method includes forming at a traffic management device a session identifier in response to a first request from a client device for access to a network application. The Ser. No. 13/014,340.3 session identifier is encrypted for sending to the client device using a session variable formed by hashing at least one physical identifier associated uniquely with the client device in response to the first request. In a second request from the client device to access the network application, the encrypted session identifier is decrypted using an updated value of the session variable. The access to the network application is provided when the decrypted session identifier matches the formed session identifier, and denied when the decrypted session identifier does not match the formed session identifier.

Another example includes a computer readable medium having stored thereon instructions for providing secure application delivery, which when executed by at least one processor, causes the processor to perform a number of steps. The steps include forming at a traffic management device a session identifier in response to a first request from a client device for access to a network application. The session identifier is encrypted for sending to the client device using a session variable formed by hashing at least one physical identifier associated uniquely with the client device in response to the first request. In a second request from the client device to access the network application, the encrypted session identifier is decrypted using an updated value of the session variable. The access to the network application is provided when the decrypted session identifier matches the formed session identifier, and denied when the decrypted session identifier does not match the formed session identifier.

Another example is that of a traffic management device, which includes one or more processors executing one or more traffic management applications, a memory, a network interface controller coupled to the one or more processors and the memory and configured to receive data packets from a network that relate to the executing traffic management applications, and provide secure application delivery. In this example, at least one of the one or more processors and the network interface controller include logic capable of being further configured to form at the traffic management device a session identifier in response to a first request from a client device for access to a network application. The session identifier is encrypted for sending to the client device using a session variable formed by hashing at least one physical identifier associated uniquely with the client device in response to the first request. In a second request from the client device to access the network application, the encrypted session identifier is decrypted using an updated value of the session variable. The access to the network application is provided when the decrypted session identifier matches the formed session identifier, and denied when the decrypted session identifier does not match the formed session identifier.

The examples offer numerous advantages. By way of example only, in order to prevent a session identifier theft, e.g., a cookie theft, the session identifier is uniquely bound to both a user's session and a machine or device the session originated on. By using client information available to a traffic management device interposed between the client devices and server devices, the traffic management device can bind a user session identifier to a specific session and machine, helping to minimize theft of authenticated cookies directly from the client device and/or in transit. Further, the examples utilize an out of band communication (or, a separate or independent communication channel) to obtain the physical identifier used in encrypting and decrypting a session identifier (e.g., a cookie). The out of band communication is separate from and independent of a communication channel used for actual transmission/reception of the encrypted/decrypted session identifier and for key management. These and other advantages, aspects, and features will become more apparent from the following detailed description when viewed in conjunction with the accompanying drawings. Non-limiting and non-exhaustive examples are described with reference to the following drawings. Accordingly, the drawings and descriptions below are to be regarded as illustrative in nature, and not as restrictive or limiting.

DETAILED DESCRIPTION

Figure 1:
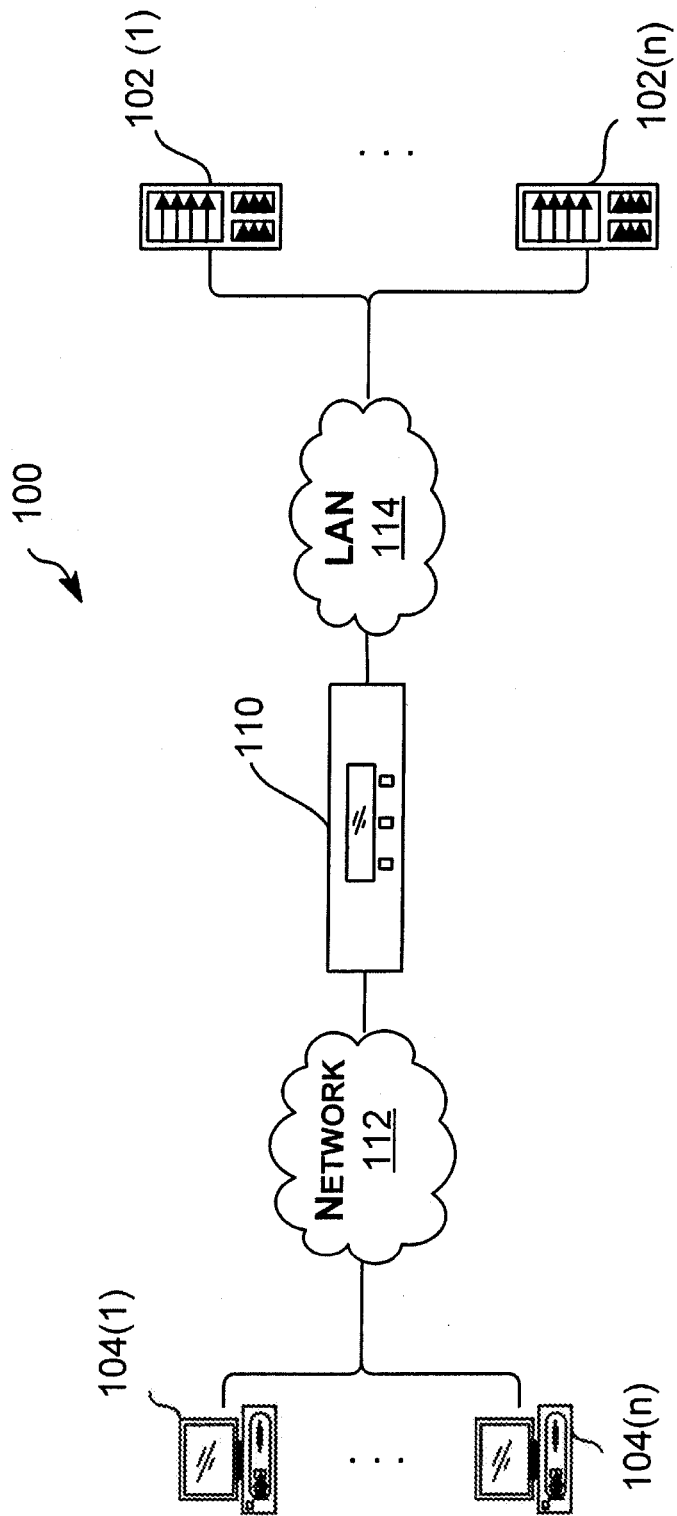
FIG. 1 illustrates an exemplary network system environment using traffic management device for binding a session identifier to a machine specific physical identifier (ID)

Referring to FIG. 1, an exemplary network system 100 including a traffic management device 110 that can provide secure application delivery, for example, by binding session identifiers (e.g., cookies) to one or more unique physical identifiers associated with client computers 104(1) to 104(n) for reducing and/or preventing session identifier theft is illustrated. By way of example only, a network 112 can provide responses and requests according to the Hyper-Text Transfer Protocol (HTTP) based application, request for comments (RFC) protocol or the Common Internet File System (CIFS) or network file system (NFS) protocol in this example, although the principles discussed herein are not limited to these examples and can include other application protocols and other types of requests (e.g., File Transfer Protocol (FTP) based requests). The exemplary network system 100 can include a series of one or more client devices such as client computers 104(1) to 104(n). Client computers 104(1)-104(n) are coupled to traffic management device 110 interposed in between servers 102(1) to 102(n) and the client devices 104(1) to 104(n) for providing one or more communication channels through network 112 and a Local Area Network (LAN) 114, although other communication channel may be directly established between various devices in network system 100 without network 112 and/or LAN 114. For clarity and brevity, in FIG. 1 two server devices 102(1) and 102(n) are shown, but it should be understood that any number of server devices can use the exemplary network system 100. Likewise, two client devices 104(1)-104(n) and one traffic management device 110 are shown in FIG. 1, but any number of client devices and traffic management devices can also use the exemplary network system 100 as well. Although network 112 and LAN 114 are shown, other numbers and types of networks could be used. The ellipses and the designation "n" denote an unlimited number of server devices and client devices, respectively.

Servers 102(1)-102(n) comprise one or more server computing machines or devices capable of operating one or more Web-based applications that may be accessed by network devices in the network 112, such as client computers 104 (1)-104(n) (also referred to as client devices 104(1)-104(n)), via traffic management device 110, and may provide other data representing requested resources, such as particular Web page(s), image(s) of physical objects, and any other objects, responsive to the requests, although the servers 102(1)-102(n) may perform other tasks and provide other types of resources. It should be noted that while only two servers 102(1) and 102(n) are shown in the network system 100 depicted in FIG. 1, other numbers and types of servers may be coupled to the traffic management device 110. It is also contemplated that one or more of the servers 102(1)-102(n) may be a cluster of servers managed by a network traffic management device such as traffic management device 110.

The client computers 104(1)-104(n) in this example (also interchangeably referred to as client devices, client computing devices, and client computing systems) can run interface applications such as Web browsers that can provide an interface to make requests for and send data to different Web server-based applications via the network 112 and via traffic management device 110. A series of network applications can run on the servers 102(1)-102(n) that allow the transmission of data that is requested by the client computers 104(1)-104(n). The servers 102(1)-102(n) can provide data or receive data in response to requests directed toward the respective applications on the servers 102(1)-102(n) from the client computers 104(1)-104(n). For example, as per the Transmission Control Protocol (TCP), packets can be sent to the servers 102(1)-102(n) from the requesting client computers 104(1)-104(n) to send data, although other protocols (e.g., FTP) may be used. It is to be understood that the servers 102(1)-102(n) can be hardware or software or can represent a system with multiple servers, which can include internal or external networks. In this example, the servers 102(1)-102(n) can be any version of Microsoft® IIS servers or Apache® servers, although other types of servers can be used. Further, additional servers can be coupled to the network 112 and/or LAN 114 and many different types of applications can be available on servers coupled to the network 112 and/or LAN 114.

Generally, the client devices such as the client computers 104(1)-104(n) can include virtually any computing device capable of connecting to another computing device to send and receive information, including Web-based information. The set of such devices can include devices that typically connect using a wired (and/or wireless) communications medium, such as personal computers (e.g., desktops, laptops), mobile and/or smart phones and the like. In this example, the client devices can run browsers and other types of applications (e.g., web-based applications) that can provide an interface to make one or more requests to different server-based applications via the network 112, although requests for other types of network applications may be made by the client computers 104(1)-104(n). Client computers 104(1)-104(n) can be configured to receive encrypted session identifiers (e.g., cookies) from traffic management device 110, or other types of traffic management devices (e.g., routers, load balancers, application delivery controllers, and the like). The encrypted session identifier when returned by one of the client computers 104(1)-104(n) to the traffic management device 110 can be used, for example, to authorize access to the network applications stored on one or more servers 102(1)102(n) to the client computers 104(1)-104(n). Client computers 104(1)-104(n) can have one or more unique physical identifiers that are obtained by the traffic management device 110 to encrypt the client session identifier (e.g., a cookie). The unique physical identifiers associated with each of client computers 104(1)-104(n) can be stored at respective local databases or memory units of each of the client computers 104(1)-104(n). Alternatively, such physical identifiers can be parts of one or more physical components of the client computers 104(1)-104(n). By way of example only, and not by way of limitation, the unique physical identifiers associated with each of client computers 104(1)-104(n) can be one or more of a media access control (MAC) identifier (ID), a central processing unit (CPU) identifier, a basic input-output system (BIOS) serial number, a unique biometric device identifier, and a secure hardware token, each unique to the client device, although other types of unique physical identifiers that can form a seed of an encryption key used to form the session identifier associated with one of the client computers 104(1)-104(n) may be used, as can be contemplated by one of ordinary skill in the art after reading this disclosure. The unique physical identifiers of client computers 104(1)-104(n) can be obtained by the traffic management device 110 performing an application programming interface call to an appropriate one of the client computers 104(1)-104(n) and parsing a database (e.g., a registry on the client device) associated with an operating system of the client device, for example, after authenticating the client device. Alternatively, the unique physical identifier may be obtained independent from the authentication of the client device. In some examples, when one or more of the physical identifiers at any one or more of the client computers 104(1)-104(n) is disabled (e.g., a CPU ID disabled by an operating system of the client device), a null value can then be used by the traffic management device 110, as will be described in more detail with reference to FIGS. 2 and 3 below.

A series of Web-based and/or other types of protected and unprotected network applications can run on the application servers 102(1)-102(n) that allow the transmission of data that is requested by the client computers 104(1)-104(n). The client computers 104(1)-104(n) can be further configured to engage in a secure communication with the traffic management device 110 and/or the servers 102(1)-102(n) using mechanisms such as Secure Sockets Layer (SSL), Internet Protocol Security (IPSec), Tunnel Layer Security (TLS), and the like.

In this example, the network 112 comprises a publicly accessible network, such as the Internet, which includes client computers 104(1)-104(n), although the network 112 may comprise other types of private and public networks that include other devices. Communications, such as requests from client computers 104(1)-104(n) and responses from servers 102(1)-102(n), take place over the network 112 according to standard network protocols, such as the HTTP and TCP/IP protocols in this example, but the principles discussed herein are not limited to this example and can include other protocols (e.g., FTP). Further, the network 112 can include local area networks (LANs), wide area networks (WANs), direct connections, other types and numbers of network types, and any combination thereof. On an interconnected set of LANs or other networks, including those based on different architectures and protocols, routers, switches, hubs, gateways, bridges, crossbars, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links, optical fibers, and other communications links known to those skilled in the relevant arts. In essence, the network 112 includes any communication medium and method by which data may travel between client devices 104(1)-104(n), servers 102(1)-102(n), and traffic management device 110, and these devices are provided by way of example only. Network 112 can support an independent communication channel (also referred to herein as an out of band channel) for communicating one or more unique physical identifiers obtained from one or more client computers 104(1)-104(n). The independent communication channel is separate from a communication channel used for transmitting and/or receiving a session identifier (e.g., a cookie), encrypted or otherwise, between the traffic management device 110 that creates the independent out of band channel and one or more client computers 104(1)-104(n).

In this example, each of the servers 102(1)-102(n), traffic management device 110, and client computers 104(1)-104(n) can include a central processing unit (CPU), controller or processor, a memory, and an interface system which are coupled together by a bus or other link, although other numbers and types of each of the components and other configurations and locations for the components can be used. Since these devices are well known to those skilled in the relevant art(s), they will not be described in further detail herein.

In addition, two or more computing systems or devices can be substituted for any one of the systems in the network system 100. Accordingly, principles and advantages of cloud computing and/or distributed processing, such as redundancy, replication, virtualization, and the like, can also be implemented, as appropriate, to increase the robustness and performance of the devices and systems of the network system 100. The network system 100 can also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, combination(s) thereof, and the like.

By way of example only and not by way of limitation, LAN 114 comprises a private local area network that includes the traffic management device 110 coupled to the one or more servers 102(1)-102(n), although the LAN 114 may comprise other types of private and public networks with other devices. Networks, including local area networks, besides being understood by those of ordinary skill in the relevant art(s), have already been described above in connection with network 112, and thus will not be described further here.

As shown in the example environment of network system 100 depicted in FIG. 1, the traffic management device 110 can be interposed between the network 112 and the servers 102(1)-102(n) coupled via LAN 114 as shown in FIG. 1. Again, the network system 100 could be arranged in other manners with other numbers and types of devices. Also, the traffic management device 110 is coupled to network 112 by one or more network communication links, including an independent autonomous out of band link for obtaining one or more unique physical identifiers from one or more client computers 104(1)-104(n), and intermediate network devices, such as routers, switches, gateways, hubs, crossbars, and other devices (not shown). It should be understood that the devices and the particular configuration shown in FIG. 1 are provided for exemplary purposes only and thus are not limiting. Although a single traffic management device 110, additional traffic management devices may be coupled in series and/or parallel to the traffic management device 110, thereby forming a cluster, depending upon specific applications, and the single traffic management device 110 shown in FIG. 1 is by way of example only, and not by way of limitation.

Generally, the traffic management device 110 manages network communications, which may include one or more client requests and server responses, to/from the network 112 between the client computers 104(1)-104(n) and one or more of the servers 102(1)-102(n) in LAN 114 in these examples. These requests may be destined for one or more servers 102(1)-102(n), and, as alluded to earlier, may take the form of one or more TCP/IP data packets originating from the network 112, passing through one or more intermediate network devices and/or intermediate networks, until ultimately reaching the traffic management device 110, for example. In addition, as discussed in more detail with reference to FIGS. 2-3, traffic management device 110 is configured to provide secure application delivery. In any case, the traffic management device 110 may manage the network communications by performing several network traffic management related functions involving network communications, secured or unsecured, such as load balancing, access control, VPN hosting, network traffic acceleration, encryption, decryption, cookie and key management and binding a session identifier (e.g., a cookie) to unique machine-specific physical identifiers to prevent theft of the session identifier in accordance with the processes described further below in connection with FIGS. 2-3, for example.

Figure 2:
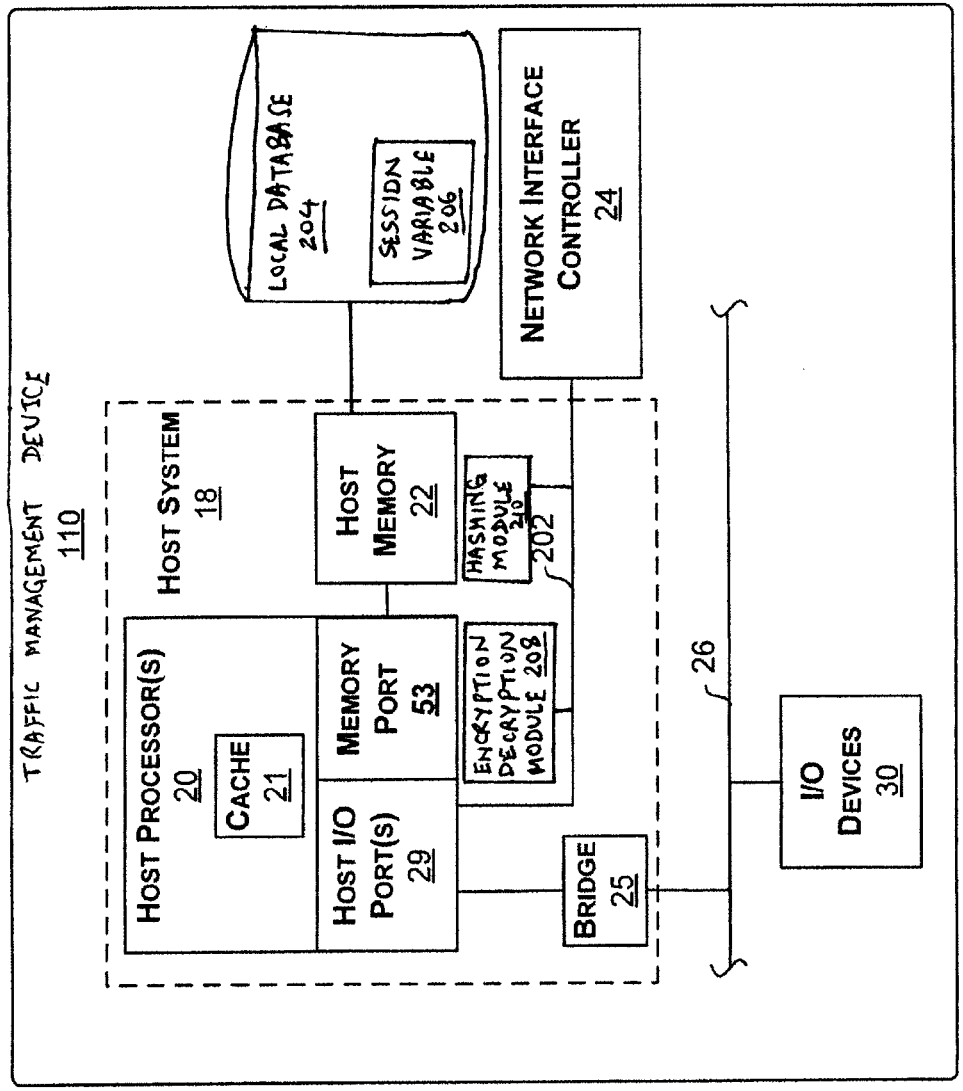
FIG. 2 is a partly schematic and partly functional block diagram of traffic management device in the exemplary network environment of FIG. 1.

FIG. 2 illustrates an example traffic management device 110. Included within the traffic management device 110 is a system bus 26 (also referred to as bus 26) that communicates with a host system 18 via a bridge 25 and with an input-output (I/O) device 30. In this example, a single I/O device 30 is shown to represent any number of I/O devices connected to bus 26. In one example, bridge 25 is in further communication with a host processor 20 via host input output (I/O) ports 29. Host processor 20 can further communicate with a network interface controller 24 via a CPU bus 202, a host memory 22 (via a memory port 53), and a cache memory 21. As outlined above, included within the host processor 20 are host I/O ports 29, memory port 53, and a main processor (not shown separately). In this example, host system 18 includes an encryption-decryption module 208 and a hashing module 210.

In one example, traffic management device 110 can include the host processor 20 characterized by anyone of the following component configurations: computer readable medium and logic circuits that respond to and process instructions fetched from the host memory 22; a microprocessor unit, such as: those manufactured by Intel Corporation of Santa Clara, Calif.; those manufactured by Motorola Corporation of Schaumburg, Ill.; those manufactured by Transmeta Corporation of Santa Clara, Calif.; the RS/6000 processor such as those manufactured by International Business Machines of Armonk, N.Y.; a processor such as those manufactured by Advanced Micro Devices of Sunnyvale, Calif.; or any other combination of logic circuits capable of executing the systems and methods described herein. Still other examples of the host processor 20 can include any combination of the following: a microprocessor, a microcontroller, a central processing unit with a single processing core, a central processing unit with two processing cores, or a central processing unit with more than one processing core.

Examples of the traffic management device 110 include one or more application delivery controller devices of the BIG-IP® product family provided by F5 Networks, Inc. of Seattle, Wash., although other types of traffic management devices may be used. In an exemplary structure and/or arrangement, traffic management device 110 can include the host processor 20 that communicates with cache memory 21 via a secondary bus also known as a backside bus, while another example of the traffic management device 110 includes the host processor 20 that communicates with cache memory 21 via the system bus 26. The local system bus 26 can, in some examples, also be used by the host processor 20 to communicate with more than one type of I/O devices 30. In some examples, the local system bus 26 can be anyone of the following types of buses: a VESA VL bus; an ISA bus; an EISA bus; a Micro Channel Architecture (MCA) bus; a PCI bus; a PCI-X bus; a PCI-Express bus; or a NuBus. Other example configurations of the traffic management device 110 include I/O device 30 that is a video display (not shown separately) that communicates with the host processor 20 via an Advanced Graphics Port (AGP). Still other versions of the traffic management device 110 include host processor 20 connected to I/O device 30 via any one or more of the following connections: HyperTransport, Rapid I/O, or InfiniBand. Further examples of the traffic management device 110 include a communication connection where the host processor 20 communicates with one I/O device 30 using a local interconnect bus and with a second I/O device (not shown separately) using a direct connection. As described above, included within some examples of the traffic management device 110 is each of host memory 22 and cache memory 21. The cache memory 21, will, in some examples, be any one of the following types of memory: SRAM; BSRAM; or EDRAM. Other examples include cache memory 21 and host memory 22 that can be anyone of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing the systems and methods described herein.

The host memory 22 and/or the cache memory 21 can, in some examples, include one or more memory devices capable of storing data and allowing any storage location to be directly accessed by the host processor 20. Such storage of data can be in a local database 204 used, by way of example only, to store one or more session variables, e.g., a session variable 206, formed by hashing at least one physical identifier associated uniquely with the client computers 104(1)-104(n) in response to a request from one or more of client computers 104(1)-104(n), although the local database 204 may store other additional data. It is to be noted that local database 204 can be optionally located within host memory 22, and the location of the local database 204 shown in FIG. 2 is by way of example only, and not by way of limitation. Alternatively, local database 204 may be outside traffic management device 110 and coupled externally via one or more input output ports of network interface controller 24. Examples of local database 204 may include Microsoft Access® database provided by Microsoft Corporation of Redmond, Wash., or an Oracle® database provided by Oracle Corporation of Redwood Shores, Calif., although one of ordinary skill in the art, after reading this disclosure can contemplate other types and numbers of databases, custom built or standardized, which may be used to implement local database 204. Further examples of traffic management device 110 include a host processor 20 that can access the host memory 22 via one of either: system bus 26; memory port 53; or any other connection, bus or port that allows the host processor 20 to access host memory 22.

One example of the traffic management device 110 provides support for anyone of the following installation devices: a floppy disk drive for receiving floppy disks such as 3.5-inch, 5.25-inch disks or ZIP disks, a CD-ROM drive, a CD-R/RW drive, a DVD-ROM drive, tape drives of various formats, USB device, a bootable medium, a bootable CD, a bootable compact disk (CD) for GNU/Linux distribution such as KNOPPIX®, a hard-drive or any other device suitable for installing applications or software. Applications can, in some examples, include a client agent, or any portion of a client agent. The traffic management device 110 may further include a storage device (not shown separately) that can be either one or more hard disk drives, or one or more redundant arrays of independent disks; where the storage device is configured to store an operating system, software, programs applications, or at least a portion of the client agent. A further example of the traffic management device 110 includes an installation device that is used as the storage device.

Furthermore, the traffic management device 110 can include network interface controller 24 to communicate, via an input-output port inside network interface controller 24, with a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, optical connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the traffic management device 110 includes network interface controller 24 configured to communicate with additional computing devices via any type and/or form of gateway or tunneling protocol such as Secure Socket Layer (SSL) or Transport Layer Security (TLS), or the Citrix Gateway Protocol manufactured by Citrix Systems, Inc. of Fort Lauderdale, Fla. Versions of the network interface controller 24 can comprise anyone of: a built-in network adapter; a network interface card; a PCM-CIA network card; a card bus network adapter; a wireless network adapter; a USB network adapter; a modem; or any other device suitable for interfacing the traffic management device 110 to a network capable of communicating and performing the methods and systems described herein.

In various examples, the traffic management device 110 can include any one of the following I/O devices 30: a keyboard; a pointing device; a mouse; a gesture based remote control device; a biometric device; an audio device; track pads; an optical pen; trackballs; microphones; drawing tablets; video displays; speakers; inkjet printers; laser printers; and dye sublimation printers; or any other input/output device able to perform the methods and systems described herein. Host I/O ports 29 may in some examples connect to multiple I/O devices 30 to control the one or more I/O devices 30. Some examples of the I/O devices 30 may be configured to provide storage or an installation medium, while others may provide a universal serial bus (USB) interface for receiving USB storage devices such as the USB Flash Drive line of devices manufactured by Twintech Industry, Inc. Still other examples of an I/O device 30 may be bridge 25 between the system bus 26 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

According to some examples, traffic management device 110 includes encryption-decryption module 208 and hashing module 210 integrated as part of host system 18 for carrying out various exemplary functions of binding a session identifier to one or more machine-specific unique physical identifiers (IDs) to prevent theft of the session identifier (e.g., a cookie). Alternatively, encryption-decryption module 208 and hashing module 210 may be a part of an autonomous application security manager module integrated with or communicating independently with the traffic management device 110. An exemplary application security manager is the BIG-IP® Application Security Manager™ provided by F5 Networks, Inc. of Seattle, Wash.

By way of example only, after a user on one of the client computers 104(1)-104(n) has been authorized, using hashing module 210, which also includes hardware and logic circuitry, traffic management device 110 performs a hash upon the one or more unique physical identifiers to create respective one or more session variables, e.g., session variable 206. Based upon signals from the hashing module 210 over bus 26, session variables are rebuilt and updated, as will also be described in detail below with reference to FIG. 3. The algorithms implemented by hashing module 210 may include standard hashing techniques for two or more variables, well known to those of ordinary skill in the art.

By way of example only, encryption-decryption module 208 is configured to encrypt the session identifier (e.g., a cookie) for sending to the client device (e.g., client computer 104(1)) using session variable 206 stored in local database 204 formed by hashing at least one physical identifier associated uniquely with the client device in response to a request. Such encryption can be hardware based, software based, or a combination thereof depending upon specific applications. Encryption-decryption module 208 is further configured to decrypt the encrypted session identifier(s) when received in a second request or response from the client device to access the network application using an updated value of the session variable 206.

Accordingly, components of traffic management device 110 form a session identifier (e.g., a cookie) in response to a first request from a client device (e.g., client computer 104(1)) for access to a network application; encrypt, using an exemplary encryption-decryption module 208 inside host system 18, the session identifier for sending to the client device using session variable 206, stored in local database 204 optionally coupled to host memory 22 within the traffic management device 110, formed by hashing at least one physical identifier (e.g., a CPU ID of one of client computers 104(1)-104(n)) associated uniquely with the client device in response to the first request; decrypt, using the exemplary encryption-decryption module 208, the encrypted session identifier when received in a second request from the client device to access the network application using an updated value of the session variable 206; and providing an access to the network application to the client device when the decrypted session identifier matches the formed session identifier, and denying the access to the network application to the client device when the decrypted session identifier does not match the formed session identifier.

Figure 3:
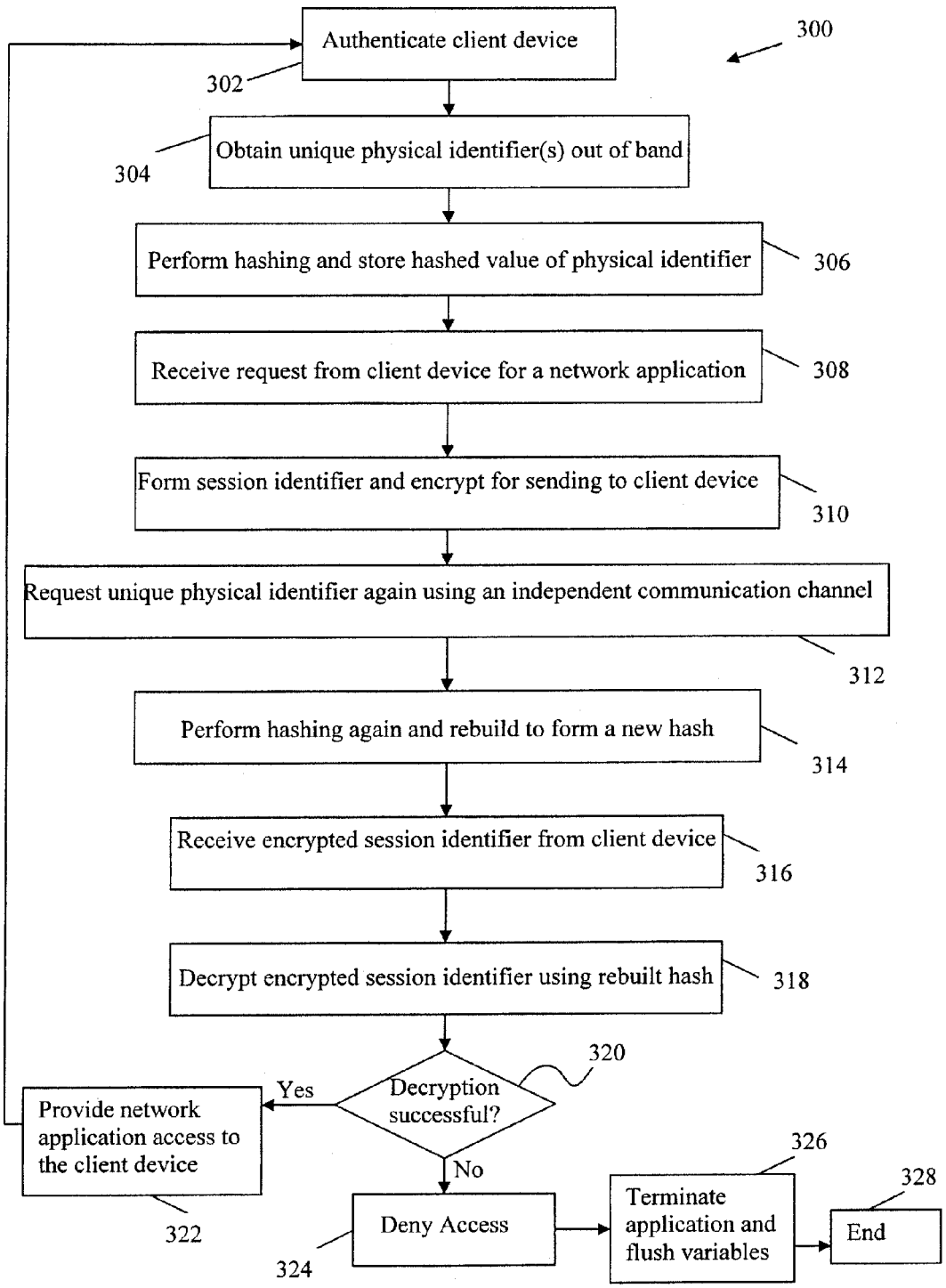
FIG. 3 is a flowchart of an exemplary process and method for binding a session identifier to machine-specific identifiers (IDs) for preventing theft of the session identifier.

The operation of an example process for binding a session identifier to one or more machine-specific unique physical identifiers (IDs) to prevent theft of the session identifier using traffic management device 110 shown in FIGS. 1-2, will now be described with reference back to FIGS. 1-2 in conjunction with a flow diagram or flowchart 300 shown in FIG. 3. The flowchart 300 in FIG. 3 is representative of example machine readable instructions for implementing binding a session identifier to one or more machine-specific unique physical identifiers (IDs) to prevent theft of the session identifier, for example, at the traffic management device 110. In this example, the machine readable instructions comprise an algorithm for execution by: (a) a processor (e.g., host processor 20), (b) a controller, and/or (c) one or more other suitable processing device(s) within host system 18, for example. The algorithm may be implemented in software stored on tangible computer readable media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or implemented in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, or the like). For example, at least some of the components of the traffic management device 110 could be implemented by software, hardware, and/or firmware. Also, some or all of the machine readable instructions represented by process of the flowchart 300 of FIG. 3 may be implemented manually at the traffic management device 110, for example, using a command line interface (CLI) prompt window. Further, although the example algorithm is described with reference to the flowchart 300 illustrated in FIG. 3, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Referring now to FIG. 3, in step 302 of the flowchart 300, traffic management device 110 receives a request for authentication of a user at one of the client computers 104(1)-104(n), and accordingly performs authenticating the request from the client computer. By way of example only, the authentication can be performed by requesting the user for a user name and password, although other forms of authentication may be used. It is to be noted that although a single user session is being described here with respect to flowchart 300, users at more than one client computers 104(1)-104(n) can be authenticated at the same time. Additionally, the same client computer may be authenticated at different instances of time for the same and/or a different network application residing on one or more of servers 102(1)-102(n) requested by the user of the client computer. An exemplary scenario for authenticating one or more users on one or more client computers 104(1)-104(n) is an online banking operation that verifies an identity of the user requesting an online banking session to conduct the online banking operation, although other authentication scenarios with secure implementations can be contemplated by one of ordinary skill in the art after reading this disclosure. In one example, client computers 104(1)-104(n) may request access to network applications via traffic management device 110 using one or more hypertext transfer protocol (HTTP) requests. Alternatively, client computers 104(1)-104(n) may request access to network applications via traffic management device 110 using other types of request formats, for example, a file transfer protocol (FTP) request.

In step 304, once the user has been authenticated to a particular application by the traffic management device 110, the traffic management device 110 communicates with the client computer hosting the user for obtaining one or more unique physical identifier from the client computer. For example, traffic management device 110 can obtain the unique one or more physical identifiers via an application programming interface (API) call, or by parsing out a database associated with an operating system of the client device (for example, a registry of a Windows® operating system user). By way of example only and not by way of limitation, the unique physical identifiers can be one or more of a media access control (MAC) identifier ID, a central processing unit (CPU) ID, a basic input-output system (BIOS) serial number, a unique biometric device identifier, and a secure hardware token, or other types of physical identifiers each unique to the authenticated one of the client computers 104(1)-104(n) that can be used to tie a network session for one or more of the client computers 104(1)-104(n) with respective machine specific identifiers associated with the one or more client computers 104(1)-104(n) can be used. In one example, the traffic management device 110 using network interface controller 24 allocates a dedicated out of band or independent communication channel for obtaining the one or more physical identifiers. Such a dedicated out of band channel is independent of other communication channels between the traffic management device 110 and the client computers 104(1)-104(n). By way of example only, the dedicated out of band communication channel is separate from a communication band for exchanging a session identifier between one or more client computers 104(1)-104(n) and servers 102(1)-102(n) associated with the authenticated session of step 302 above, or a channel used for key management purposes. Further by way of example only, the dedicated out of band channel can be implemented by using a band allocation software executing on the host system 18 at the discretion of a system administrator, by using exclusively dedicated hardware circuitry and hardware ports of network interface controller 24, or using a combination of hardware and software. The dedicated out of band channel can be the same one used for authentication in step 302, for example, when the traffic management device 110 requests the user's username and password. The authentication of step 302 happens outside of the user's request for actual session, for example, an online banking website session. In examples discussed herein, the request for machine-specific data (e.g., one or more unique physical identifiers) happens over the authentication channel that is out of band of the session request channel (e.g., a communication channel used for establishing and servicing a website session request). An exemplary advantage of using separate channels is that an eavesdropper looking for only a session identifier will not be able to obtain the one or more unique physical identifiers and will be unaware of such an independent out of band communication channel for obtaining the one or more unique physical identifiers associated with the authenticated one of the client computers 104(1)-104(n). Accordingly, as will be explained in more detail below, even if the eavesdropper obtains the session identifier, a decryption of the session identifier by the eavesdropper for malicious access to the network application will fail.

In step 306, the hashing module 210 in the traffic management device 110 performs hashing at least one physical identifier associated uniquely with the requesting one of the client computers 104(1)-104(n) in response to the request for access to a network application stored on one or more servers 102(1)-102(n). By way of example only and not by way of limitation, the hashing can be performed using both MAC ID and a CPU ID obtained from the requesting one of the client computers 104(1)-104(n), although the hashing may be performed by using only one of the physical identifiers (e.g., only MAC ID, or only CPU ID). The hashed value of the one or more physical identifiers is assigned to session variable 206 for storage in local database 204. In one example, the session variable 206 may be named as "session.machine.id" indicating the authenticated session is bound to a machine identifier (ID) of the requesting one of the client computers 104(1)-104(n), although other formats of session variable 206 may be used, as can be contemplated by one of ordinary skill in the art after reading this disclosure. Further, session variable 206 can be stored in local database 204 along with other session variables associated with one or more client computers 104(1)-104(n). Further, the location of storage of session variable 206 formed by the hashing module is exemplary only, and in alternative scenarios, session variable 206 may be stored in different locations, e.g., a buffer or cache memory 21 in host system 18. In the event, when a physical identifier associated with the requesting one of the client computers 104(1)-104(n) is disabled, e.g., a CPU ID disabled by an operating system of the requesting one of the client computers 104(1)-104(n), hashing module 210 may perform hashing by utilizing a null value of the disabled physical identifier to form the session variable 206.

In step 308, traffic management device 110 receives a new request from the client computer that was authenticated for accessing a network application within the same session established in step 302. In this example, network application for which the user of one of the client computers 104(1)-104(n) requests access to can be a protected application. Although the authenticating of the client computer in step 302 was performed before receiving the new request, it is to be noted that the term "request" can generally include, by way of example only, any communication from one of the client computers 104(1)-104(n) for network resources or applications within a same session after the authentication after a period of time determined by or dependent upon a user of the requesting one of the client computers 104(1)-104(n).

In step 310, traffic management device 110 builds or forms a session identifier (e.g., a cookie) and data associated with the session identifier to be used by the requested network resource or application. In one example, a cookie is formed by the requested network application or by the traffic management device 110 based on application data, although other types of session identifiers may be used instead of a cookie. Before returning the formed session identifier to the user on the authenticated one of the client computers 104(1)-104(n), the encryption-decryption module 208 encrypts the entire session identifier using the value of session variable 206 as an encryption key. It is to be noted that sending the encrypted session identifier occurs over a communication channel separate from and independent of the out of band communication channel used for obtaining the one or more unique physical identifiers, as discussed above with reference to step 304. In some alternative examples, sending of the encrypted session identifier and the obtaining the one or more physical identifier could be over the same channel but in distinct time division multiplexed slots for each respective operation (obtaining physical identifiers or sending encrypted session identifier).

In step 312, traffic management device 110 re-requests one or more physical identifiers from the requesting one of the client computers 104(1)-104(n) over the dedicated out of band communication channel. The re-requesting by the traffic management device 110 can be performed at regular time intervals, or at random time intervals depending upon various parameters (e.g., a session traffic load). Alternatively, when a user session has been established, the client computer can voluntarily send one or more unique physical identifiers to the traffic management device to update the value of session variable 206 at regular or random time intervals within or outside the authenticated session. Further, the one or more unique physical identifiers obtained is step 304 may or may not be the same as the one or more unique physical identifiers obtained by the traffic management device 110 in step 312, as long as the obtained one or more unique physical identifiers are unique to the requesting one of the client computers 104(1)-104(n) and are useful in uniquely identifying the requesting one of the client computers 104(1)-104(n) by binding the session to the unique one or more physical identifiers as discussed herein.

In step 314, using the re-requested one or more physical identifiers from the requesting one of the client computers 104(1)-104(n) obtained over the dedicated out of band communication channel in step 312 (also interchangeably referred to herein as an independent communication channel), hashing module 210 in traffic management device 110 re-builds the hash value of session variable 206, for example, every 30 seconds and continually re-assigns the value to session variable 206 (e.g., to "session.machine.id") maintaining a fresh value of the session variable 206 on local database 204 (or alternatively, on one or more of servers 102(1)-102(n) when required). Alternatively, traffic management device 110 may push the rebuilt hash value to an exemplary permanent database on the traffic management device 110 or outside traffic management device 110 in an external database (not shown). This exemplary repetition time for hashing could be configured to be automatic, to happen with every HTTP request form one or more of the client computers 104(1)-104(n) in a secure environment, be hard-coded by application, be based upon a time stamp associated with one or more subsequent requests from the client computers 104(1)-104(n), or dependent on other programmable parameters (e.g., depending upon session traffic load between client computers 104(1)-104(n) and servers 102(1)-104(n)). In any case, traffic management device 110, stores the most recent value of session variable 206. Further, rebuilding the hash value of the session variable 206 repetitively by the traffic management device 110 at one or more instances of time, occurs independently of the encrypting and/or the decrypting, over a communication band separate from a communication band for exchanging the session identifier between the client computers 104(1)-104(n) and servers 102(1)-102(n).

In step 316, traffic management device 110 receives the encrypted session identifier back from the requesting one of the client computers 104(1)-104(n) as part of a new user request to the protected network application. Traffic management device 110 may receive encrypted session identifier at regular intervals of time from the client computers 104(1)-104(n), or at instances of time when one or more of the client computers 104(1)-104(n) that have an authenticated session with one or more servers 102(1)-102(n) via traffic management device 110 request access to a network resources within a protected network application. For example, traffic management device 110 may receive an encrypted cookie when a user on the authenticated one of the client computers 104(1)-104(n) browses to a different web page in a website and requests resources in the new web page to which the user browses to.

In step 318, encryption-decryption module 208 in traffic management device 110 decrypts the encrypted session identifier using the updated rebuilt hash value using session variable 206 as a decryption key. In one example, the decryption key is never stored by the traffic management device 110; but is always referenced by the session variable 206 (e.g., using variable name "session.machine.id"). The encryption-decryption module 208 can perform decrypting using host processor 20 and cache memory 18, by way of example only. According to the examples of this technology, the encrypting performed in step 310 and the decrypting performed in step 318 can repeat for every response received from the requesting one of the client computers 104(1)-104(n) until the client computer closes the session associated with the network application for which the client computer was authenticated in step 302. Alternatively, the session may be closed due to other reasons including, by way of example only, an unexpected unavailability of resources in the network application, or other reasons that may cause network applications to terminate that may be contemplated by one of ordinary skill in the art after reading this disclosure.

In step 320, a determination is made by the traffic management device whether the decryption performed in step 318 is successful or not. For example, decryption is deemed successful when the decrypted session identifier matches the original session identifier formed in step 310, although other criteria for this determination of successful decryption may be applied.

If decryption was successful, the "Yes" branch is followed to step 322. In step 322, upon successful decryption the session is allowed to continue by the traffic management device 110. The updated session identifier is used for encryption again, and the flow proceeds back to step 302 such that steps 304-318 are repeated. The repetition of one or more of steps 304-318 can continue, for example, until the user of the requesting one of client computers 104(1)-104(n) logs out of the application.

However, if the key value stored in session variable 206 has changed, for example, due to a different physical identifier value (e.g., a different CPU ID) indicating a different user who was not authenticated, decryption of the session identifier will fail and the "No" branch is followed to step 324. In step 324, the requesting one of the client computers 104(1)-104(n) will be denied access to the protected network application e.g., by presentation of an error message. An unsuccessful decryption can indicate the user's machine data has changed, and an eavesdropper or a malicious user has attempted to use the same authenticated session cookie on another machine, different from the requesting one of client computers 104(1)-104(n) that was authenticated in step 302.

In step 326, when the traffic management device 110 determines the decryption of the session identifier has failed, traffic management device 110 cleanly terminates the previously authenticated session (as described in step 302), and flushes or clears all variables associated with the session including session variable 206 stored in local database 204. Alternatively, the user may be prompted for another form of authentication and the flow may proceed back to step 302 (not shown), depending on the configuration setup needs of the network application and/or setting of the traffic management device 110, for example. In step 328, the flowchart 300 ends.

The examples of the technology described herein provide numerous advantages. For example, when session hijacking attacks involving theft of session identifiers (e.g., cookies) are anonymous attacks, the attacker would have no way of knowing what the original client computer's unique one or more physical identifiers (e.g., CPU ID or MAC address) was, and merely stealing the session identifier would be useless because decryption would fail. In another scenario, in the event of a targeted attack where one or more of the physical identifiers may be known, an additional number of unique physical identifiers can be obtained from the client computer at a random instance of time unknown to the attacker and using more than one of the physical identifier values can provide the additional degrees of security than what is provided by a single physical identifier (e.g., using a MAC address or MAC ID only). For example, in the event that the MAC ID is stolen off the wire by an eavesdropper, the attacker would still not be able to determine the fact that hashing performed by hashing module 210 was an aggregate of additional physical identifiers beyond the MAC address (e.g., CPU ID in addition to the MAC address), or have any way of knowing the original CPU ID. Further, by providing an exclusive dedicated out of band channel programmable and implemented to request the physical identifiers from client computers 104(1)-104(n), the present technology provides an additional layer of security over conventional session identifier security schemes. By way of example only, the dedicated out of band communication channel can be proprietary and/or secured by a type of SSL connection (although, other types of secure connection schemes may be used). In one example, the out of band communication channel may be between the traffic management device 110 and the requesting one of the client computers 104(1)-104(n) over an Internet protocol other than HTTP (e.g., FTP), or it may be using Internet Protocol Security (IPsec) protocol suite for securing Internet Protocol (IP) communications independent of the HTTP connection to the network application provided to the requesting one of the client computers 104(1)-104(n).

Further, by using client specific information about client computers 104(1)-104(n) available to traffic management device 110, a user session identifier (e.g., a user cookie) can be bounded to a specific session and client machine, helping to minimize authenticated session identifier theft directly from the user's machine and/or in transit during a communication between client computers 104(1)-104(n) and servers 102(1)-102(n). Furthermore, examples of the present technology can advantageously be implemented on top of already existing security technologies implemented in the exemplary network system 100, for example, security mechanisms implemented based on Internet Protocol (IP) addresses of client computers 104(1)-104(n). Further by way of example only, the present technology is easy to implement because it can be used with exemplary ActiveX® controls provided by Microsoft Corporation of Redmond, Wash., or Java® controls provided by Oracle Corporation of Redwood Shores, Calif., embedded directly into the protected network application making the present technology substantially portable between various heterogeneous components of the exemplary network system 100.

Having thus described the basic concepts, it will be rather apparent to those skilled in the art that the foregoing detailed disclosure is intended to be presented by way of example only and is not limiting. Various alterations, improvements, and modifications will occur and are intended to those skilled in the art, though not expressly stated herein. For example, more or less number of physical identifiers can be used. The order that the measures and processes for providing secure application delivery are implemented can also be altered. Furthermore, multiple networks in addition to network 112 and LAN 114 could be associated with traffic management device 110 from/to which network packets can be received/transmitted, respectively. These alterations, improvements, and modifications are intended to be suggested by this disclosure, and are within the spirit and scope of the examples. Additionally, the recited order of processing elements or sequences, or the use of numbers, letters, or other designations therefore, is not intended to limit the claimed processes and methods to any order except as can be specified in the claims.

What is claimed is:

1. A method for providing secure application delivery, the method comprising:
obtaining by a traffic management device at least one physical identifier from a client device via an initial communication channel;
forming by the traffic management device a session identifier comprising a user cookie using the obtained at least one physical identifier in response to a first request from a client device for access to a network application;
encrypting by the traffic management device the session identifier for sending to the client device using a session variable via a dedicated communication channel different from the initial communication channel formed by hashing the obtained at least one physical identifier associated uniquely with the client device in response to the first request, wherein the obtained at least one physical identifier comprises at least one of a media access control (MAC) identifier, a central processing unit (CPU) identifier, a basic input-output system (BIOS) serial number, a unique biometric device identifier, or a secure hardware token, each unique to the client device;
decrypting by the traffic management device the encrypted session identifier received in a second request from the client device via the dedicated communication channel to access the network application using an updated value of the session variable; and
providing by the traffic management device the access to the network application when the decrypted session identifier matches the formed session identifier, and denying the access to the network application when the decrypted session identifier does not match the formed session identifier.

2. The method as set forth in claim 1 further comprising:
authenticating by the traffic management device the first request from the client device.

3. The method as set forth in claim 2, wherein the obtaining comprises at least one of performing an application programming interface call and parsing a database associated with an operating system of the client device, or wherein the obtaining is performed after the authenticating.

4. The method as set forth in claim 1, wherein the updated value of the session variable is obtained by rebuilding a hash value of the session variable repetitively at one or more instances of time, independently of the encrypting and the decrypting, over a communication band separate from a communication band for exchanging the session identifier between the client device and a server device, wherein the rebuilding is performed by obtaining the at least one physical identifier for a second time over the separate communication band, and wherein the decrypting is performed using the rebuilt hash value of the session variable.

5. The method as set forth in claim 4, wherein the one or more instances of time are determined based upon at least one of an automatically preset time period, a time stamp associated with one or more subsequent requests from the client device, or a hard-coded value of a time duration.

6. The method as set forth in claim 1, wherein at least one of the first or the second requests is a hypertext transfer protocol (HTTP) request.

7. The method as set forth in claim 1, wherein the encrypting and the decrypting repeat for every response received from the client device until the client device closes a session associated with the network application.

8. The method as set forth in claim 1, wherein the denying comprises at least one of terminating a session associated with the network application or prompting the client device for a new authentication different from an authentication associated with the first request.

9. The method as set forth in claim 1, wherein the unique session variable is formed by hashing at least two physical identifiers associated uniquely with the client device.

10. The method as set forth in claim 9, wherein the session variable is formed by utilizing a null value of at least one of the at least two physical identifiers when the at least one of the at least two physical identifiers is in a disabled state.

11. The method as set forth in claim 1, wherein the traffic management device is an application delivery controller device.

12. A non-transitory computer readable medium having stored thereon instructions for providing secure application delivery comprising machine executable code which when executed by at least one processor, causes the processor to perform steps comprising:
obtaining at least one physical identifier from a client device via an initial communication channel;
forming a session identifier comprising a user cookie using the obtained at least one physical identifier in response to a first request from a client device for access to a network application;
encrypting the session identifier for sending to the client device using a session variable via a dedicated communication channel different from the initial communication channel formed by hashing the obtained at least one physical identifier associated uniquely with the client device in response to the first request, wherein the obtained at least one physical identifier comprises at least one of a media access control (MAC) identifier, a central processing unit (CPU) identifier, a basic input-output system (BIOS) serial number, a unique biometric device identifier, or a secure hardware token, each unique to the client device;
decrypting the encrypted session identifier received in a second request from the client device via the dedicated communication channel to access the network application using an updated value of the session variable; and
providing the access to the network application when the decrypted session identifier matches the formed session identifier, and denying the access to the network application when the decrypted session identifier does not match the formed session identifier.

13. The medium as set forth in claim 12, wherein the machine executable code which when executed by the at least one processor, causes the processor to perform steps further comprising:
authenticating the first request from the client device.

14. The medium as set forth in claim 13, wherein the obtaining comprises at least one of performing an application programming interface call or parsing a database associated with an operating system of the client device, and wherein the obtaining is performed after the authenticating.

15. The medium as set forth in claim 12, wherein the updated value of the session variable is obtained by rebuilding a hash value of the session variable repetitively at one or more instances of time, independently of the encrypting and the decrypting, over a communication band separate from a communication band for exchanging the session identifier between the client device and a server device, wherein the rebuilding is performed by obtaining the at least one physical identifier for a second time over the separate communication band, and wherein the decrypting is performed using the rebuilt hash value of the session variable.

16. The medium as set forth in claim 15, wherein the one or more instances of time are determined based upon at least one of an automatically preset time period, a time stamp associated with one or more subsequent requests from the client device, or a hard-coded value of a time duration.

17. The medium as set forth in claim 12, wherein at least one of the first or the second requests is a hypertext transfer protocol (HTTP) request.

18. The medium as set forth in claim 12, wherein the encrypting and the decrypting repeat for every response received from the client device until the client device closes a session associated with the network application.

19. The medium as set forth in claim 12, wherein the denying comprises at least one of terminating a session associated with the network application or prompting the client device for a new authentication different from an authentication associated with the first request.

20. The medium as set forth in claim 12, wherein the unique session variable is formed by hashing at least two physical identifiers associated uniquely with the client device.

21. The medium as set forth in claim 20, wherein the session variable is formed by utilizing a null value of at least one of the at least two physical identifiers when the at least one of the at least two physical identifiers is in a disabled state.

22. The medium as set forth in claim 12, wherein the traffic management device is an application delivery controller device.

23. A traffic management device comprising:
one or more processors coupled to a memory and configured to be capable of executing programmed instructions comprising and stored in the memory to:
obtain at least one physical identifier from a client device via an initial communication channel;
form a session identifier comprising a user cookie using the obtained at least one physical identifier in response to a first request from a client device for access to a network application;
encrypt the session identifier for sending to the client device using a session variable via a dedicated communication channel different from the initial communication channel formed by hashing the obtained at least one physical identifier associated uniquely with the client device in response to the first request, wherein the obtained at least one physical identifier comprises at least one of a media access control (MAC) identifier, a central processing unit (CPU) identifier, a basic input-output system (BIOS) serial number, a unique biometric device identifier, or a secure hardware token, each unique to the client device;
decrypt the encrypted session identifier received in a second request from the client device via the dedicated communication channel to access the network application using an updated value of the session variable; and
provide the access to the network application when the decrypted session identifier matches the formed session identifier, and denying the access to the network application when the decrypted session identifier does not match the formed session identifier.

24. The device as set forth in claim 23, wherein the processors are further configured to be capable of executing one or more additional programmed instructions comprising and stored in the memory to authenticate the first request from the client device.

25. The device as set forth in claim 24, wherein the obtaining comprises at least one of performing an application programming interface call or parsing a database associated with an operating system of the client device, and wherein the obtaining is performed after the authenticating.

26. The device as set forth in claim 23, wherein the updated value of the session variable is obtained by rebuilding a hash value of the session variable repetitively at one or more instances of time, independently of the encrypting and the decrypting, over a communication band separate from a communication band for exchanging the session identifier between the client device and a server device, wherein the rebuilding is performed by obtaining the at least one physical identifier for a second time over the separate communication band, and wherein the decrypting is performed using the rebuilt hash value of the session variable.

27. The device as set forth in claim 26, wherein the one or more instances of time are determined based upon at least one of an automatically preset time period, a time stamp associated with one or more subsequent requests from the client device, or a hard-coded value of a time duration.

28. The device as set forth in claim 23, wherein at least one of the first and the second requests is a hypertext transfer protocol (HTTP) request.

29. The device as set forth in claim 23, wherein the encrypting and the decrypting repeat for every response received from the client device until the client device closes a session associated with the network application.

30. The device as set forth in claim 23, wherein the denying comprises at least one of terminating a session associated with the network application or prompting the client device for a new authentication different from an authentication associated with the first request.

31. The device as set forth in claim 23, wherein the unique session variable is formed by hashing at least two physical identifiers associated uniquely with the client device.

32. The device as set forth in claim 31, wherein the session variable is formed by utilizing a null value of at least one of the at least two physical identifiers when the at least one of the at least two physical identifiers is in a disabled state.

33. The device as set forth in claim 23, wherein the traffic management device is an application delivery controller device.

* * * * *